(12) United States Patent
Hiraki et al.

(10) Patent No.: US 6,868,816 B2
(45) Date of Patent: Mar. 22, 2005

(54) INTERNAL COMBUSTION ENGINE WITH BALANCER SHAFT AND METHOD OF ASSEMBLING THE SAME

(75) Inventors: Nobuyuki Hiraki, Yokohama (JP); Hiroyuki Taniai, Yokohama (JP)

(73) Assignees: Nissan Motor Co., LTD, Yokohama (JP); Renault s.a.s. societe par actions simplifiee, Boulogne-Billancourt (FR)

( * ) Notice: Subject to any disclaimer, the term of this patent is extended or adjusted under 35 U.S.C. 154(b) by 0 days.

(21) Appl. No.: 10/768,634

(22) Filed: Feb. 2, 2004

(65) Prior Publication Data

US 2004/0154575 A1 Aug. 12, 2004

(30) Foreign Application Priority Data

Feb. 6, 2003 (JP) ........................................ 2003-029738

(51) Int. Cl.[7] .............................................. F02B 75/06
(52) U.S. Cl. .................. 123/192.2; 464/180; 29/888.01
(58) Field of Search ....................... 123/192.1; 464/180; 29/888.01

(56) References Cited

U.S. PATENT DOCUMENTS 4,665,766 A    5/1987 Umeha et al.

FOREIGN PATENT DOCUMENTS

| DE | 197 54 687 A1 | 6/1999 |
|---|---|---|
| EP | 0 809 041 A2 | 11/1997 |
| GB | 2 117 837 A | 10/1983 |
| JP | 6-033989 A | 2/1994 |
| JP | 2001-012551 A | 1/2001 |

*Primary Examiner*—Andrew M. Dolinar
*Assistant Examiner*—Katrina B. Harris
(74) *Attorney, Agent, or Firm*—Foley & Lardner LLP

(57) ABSTRACT

An internal combustion engine includes a balancer housing, a balancer shaft having an eccentric weight portion and disposed within the balancer housing so as to be parallel with and rotatable in timed relation with a crankshaft, and a power transmitting mechanism that transmits rotation of the crankshaft to the balancer shaft, wherein the balancer shaft has an end portion protruding outward of the balancer housing, and wherein the end portion of the one balancer shaft is partially cut to have a flattened section that constitutes a device for positioning the balancer shaft in a predetermined rotational position. A method of assembling an internal combustion engine with a balancer shaft is also provided.

18 Claims, 4 Drawing Sheets

INTERNAL COMBUSTION ENGINE WITH BALANCER SHAFT AND METHOD OF ASSEMBLING THE SAME

BACKGROUND OF THE INVENTION

The present invention relates to an internal combustion engine with a balancer shaft and a method of assembling the same.

An internal combustion engine with a pair of balancer shafts is disclosed in Japanese Patent Provisional Publication No. 6-33989. In the engine, a balancer housing is disposed under an engine block. A drive side balancer shaft and driven side drive balancer shaft having respective eccentric weight portions are disposed within the balancer housing so as to be parallel with a crankshaft and rotatable in timed relation with each other. Between the crankshaft and the drive side balancer shaft is disposed a power transmitting mechanism including a pair of sprockets and a chain for transmitting rotation of the crankshaft to the drive side balancer shaft.

Namely, one of the sprockets is installed on the end portion of the crankshaft and the other is installed on the end portion of the drive side balancer shaft. Then, the chain is wound around the sprockets and thereafter the tension of the chain is adjusted by a chain guide and a tensioner.

SUMMARY OF THE INVENTION

In installation of the power transmitting mechanism on the crankshaft and the balancer shaft, it is necessitated to make them operate in such a timed relation that can reduce or suppress a secondary vibration of the engine generated by a reciprocating motion of pistons.

However, positioning the crankshaft and the balancer shaft in place and installing the power transmitting mechanism so as to attain a desired timed relation between them requires a quite complicated work due to a conventional layout.

It is accordingly an object of the present invention to provide an internal combustion engine with a balancer shaft that enables a power transmitting mechanism to be installed on a crankshaft and a balancer shaft with an easier work.

To achieve the above object, there is provided according to an aspect of the present invention an internal combustion engine comprising a balancer housing, a balancer shaft having an eccentric weight portion and disposed within the balancer housing so as to be parallel with and rotatable in timed relation to a crankshaft, and a power transmitting mechanism that transmits rotation of the crankshaft to the balancer shaft, wherein the balancer shaft has an end portion protruding outward of the balancer housing, and wherein the end portion of the balancer shaft is partially cut to have a flattened section that constitutes a device for positioning the balancer shaft in a predetermined rotational position.

There is provided according to another aspect of the present invention a method of assembling an internal combustion engine with a balancer shaft comprising disposing within a balancer housing a balancer shaft having an eccentric weight portion so as to be parallel with and rotatable in timed relation with a crankshaft, providing the balancer shaft with an end portion protruding outward of the balancer housing, partly cutting the end portion of the balancer shaft to form a flattened section used for positioning of the balancer shaft, providing the balancer housing with a roof-like arcuated protrusion that is opposed to the flattened section in the radial direction of the balancer shaft, and fitting a U-shaped jaw of a tool on the flattened section and the roof-like arcuated protrusion and thereby positioning the balancer shaft in a predetermined rotational position.

DESCRIPTION OF THE PREFERRED EMBODIMENT

Figure 1:
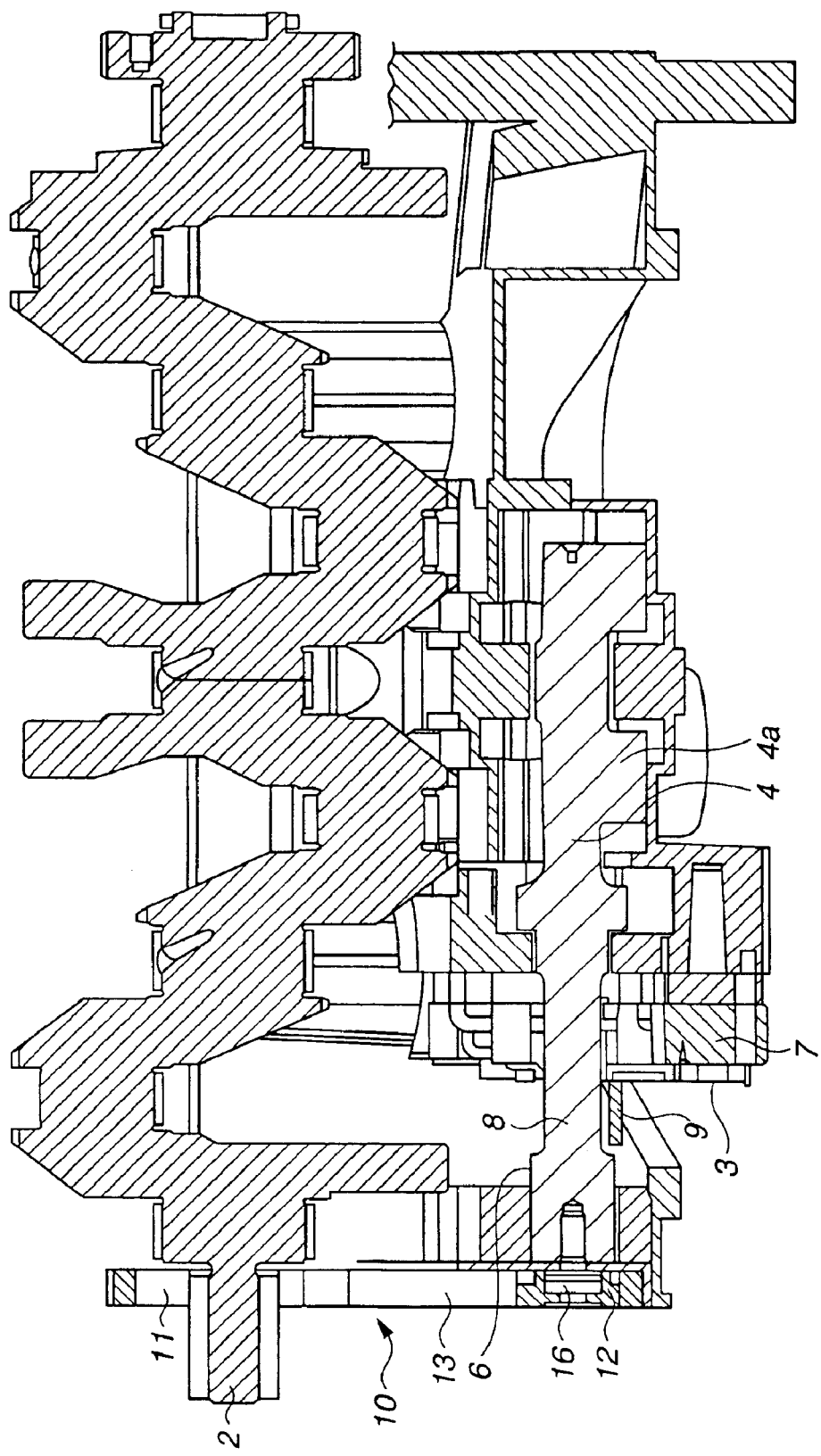
FIG. 1 is a sectional view of an important portion of an internal combustion engine with a pair of balancer shafts according to an embodiment of the present invention.
Figure 2:
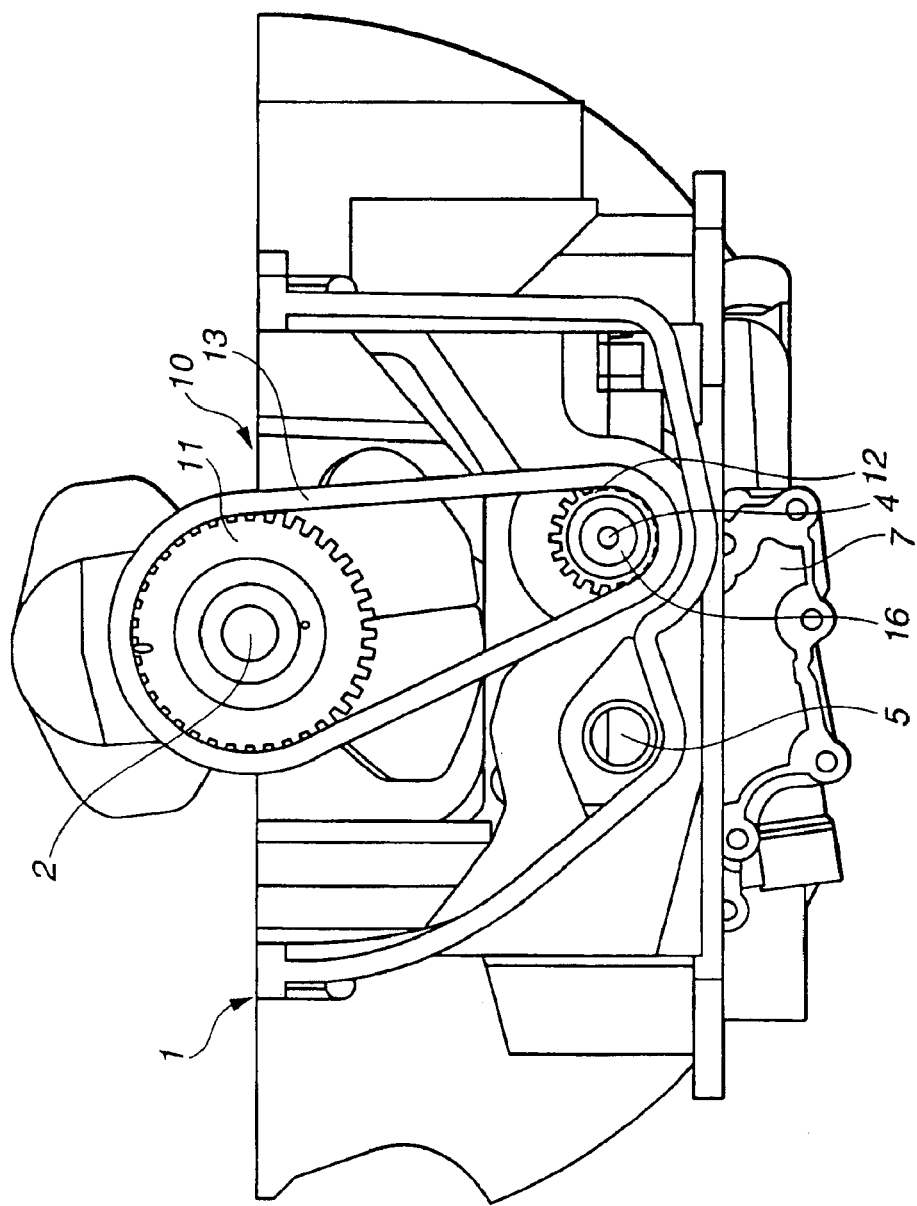
FIG. 2 is a side elevational view of the internal combustion engine of FIG. 1.

Referring to FIGS. 1 to 6, inclusive, an in-line four-cylinder internal combustion engine includes engine block 1, crankshaft 2 rotatably installed on a lower portion of engine block 1 and balancer housing 3 disposed under crankshaft 2. Disposed within balancer housing 3 in parallel with crankshaft 2 are drive side and driven (follower) side balancer shafts 4, 5 having eccentric balancer weight portions 4a.

Balancer shafts 4, 5 have reverse gears (not shown) that are meshed with each other so as to rotate in opposite directions. By this, rotation of drive side balancer shaft 4 causes driven side balancer shaft 5 to rotate in timed relation thereto.

Figure 4:
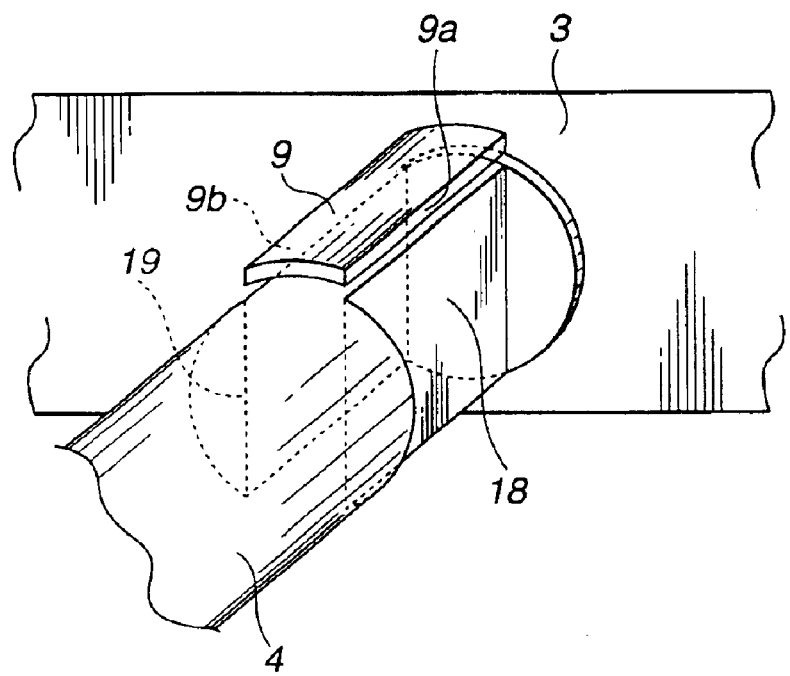
FIG. 4 is a perspective view of a flattened section of a drive side balancer shaft and a roof-like arcuated protrusion of a balancer housing employed in the internal combustion engine of FIG. 1.
Figure 5:
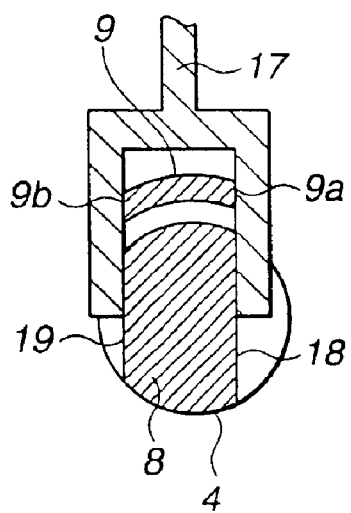
FIG. 5 is a cross sectional view of the flattened section and the roof-like arcuated protrusion of FIG. 4, together with a tool fitted on the flattened section and the roof-like arcuated protrusion.
Figure 6:
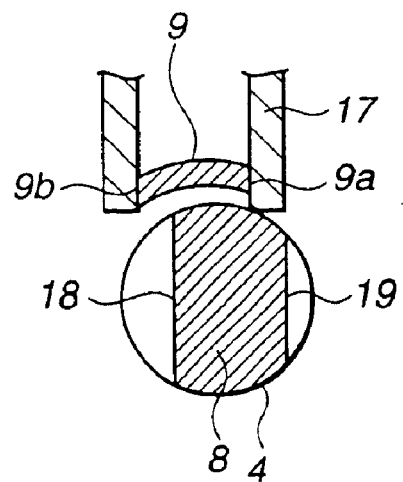
FIG. 6 is a view similar to FIG. 5 but shows the flattened section and the roof-like arcuate protrusion in a state resulting when the drive side balancer shaft is in a phase position moved from a proper phase position by 180 degrees.

Drive side balancer shaft 4 has an end portion (i.e. a left-hand end side end portion in FIG. 1) 6 that protrudes outward of balancer housing 3. End portion 6 is partly cut so as to form flattened section 8 used for positioning of balancer shaft 4. More specifically, end portion 6 is cut at diametrically opposite sections so that flattened section 8 have parallel flat surfaces 18, 19 which are unequally distant from a center axis of balancer shaft 4 as shown in FIGS. 4 to 6. Right-hand flat surface 18 that is positioned on the leading side with respect to a clockwise rotation of balancer shaft 4 when observed in FIGS. 4 to 6 is formed larger than left-hand flat surface 19 that is position on the trailing side. In this connection, flattened section 8 is asymmetrical about the center axis of balancer shaft 4 so as to serve as an eccentric balancer weight section that cooperates with eccentric balancer weight portions 4a to assist a balancing operation thereof, i.e., flattened section 8 is formed so as to have, when observed in cross section, a center of gravity or geometrical center that is offset from the center of balancer shaft 4 in the same direction as eccentric balancer weight portions 4a. By this, when crankshaft 2 and balancer shafts 4, 5 are rotated, flattened section 8 can reduce or suppress a secondary vibration of the engine in cooperation with eccentric balancer weight portions 4a of balancer shaft 4.

Balancer housing 3 has at one side thereof a roof-like arcuated protrusion 9 that is opposed to flattened section 8 in the radial direction of balancer shaft 4. Roof-like arcuated protrusion 9 is of such a cross section that is asymmetrical about the center axis of balancer shaft 4. When observed in cross section shown in FIG. 5, flattened section 8 and roof-like protrusion 9 are substantially equal in width. Namely, the distance between opposite end surfaces 9a, 9b of roof-like protrusion 9 is substantially equal to the distance between flat surfaces 18, 19 of balancer shaft 4 so that opposite end surfaces 9a, 9b of roof-like arcuate protrusion 9 are coplanar with respective flat surfaces 18, 19 of flattened section 8 when balancer shaft 4 is in a predetermined rotational or phase position. When balancer shaft 4 is in a correct rotational or phase position, flat surfaces 18, 19 of flattened section 8 and opposite end surfaces 9a, 9b of roof-like arcuated protrusion 9 are nearly positioned on respective common vertical planes as shown in FIG. 4. In the meantime, flattened section 8 and roof-like arcuated protrusion 9 are of such axial lengths that can be gripped by a U-shaped jaw of tool 17, e.g., 20 to 30 mm in length.

Figure 3:
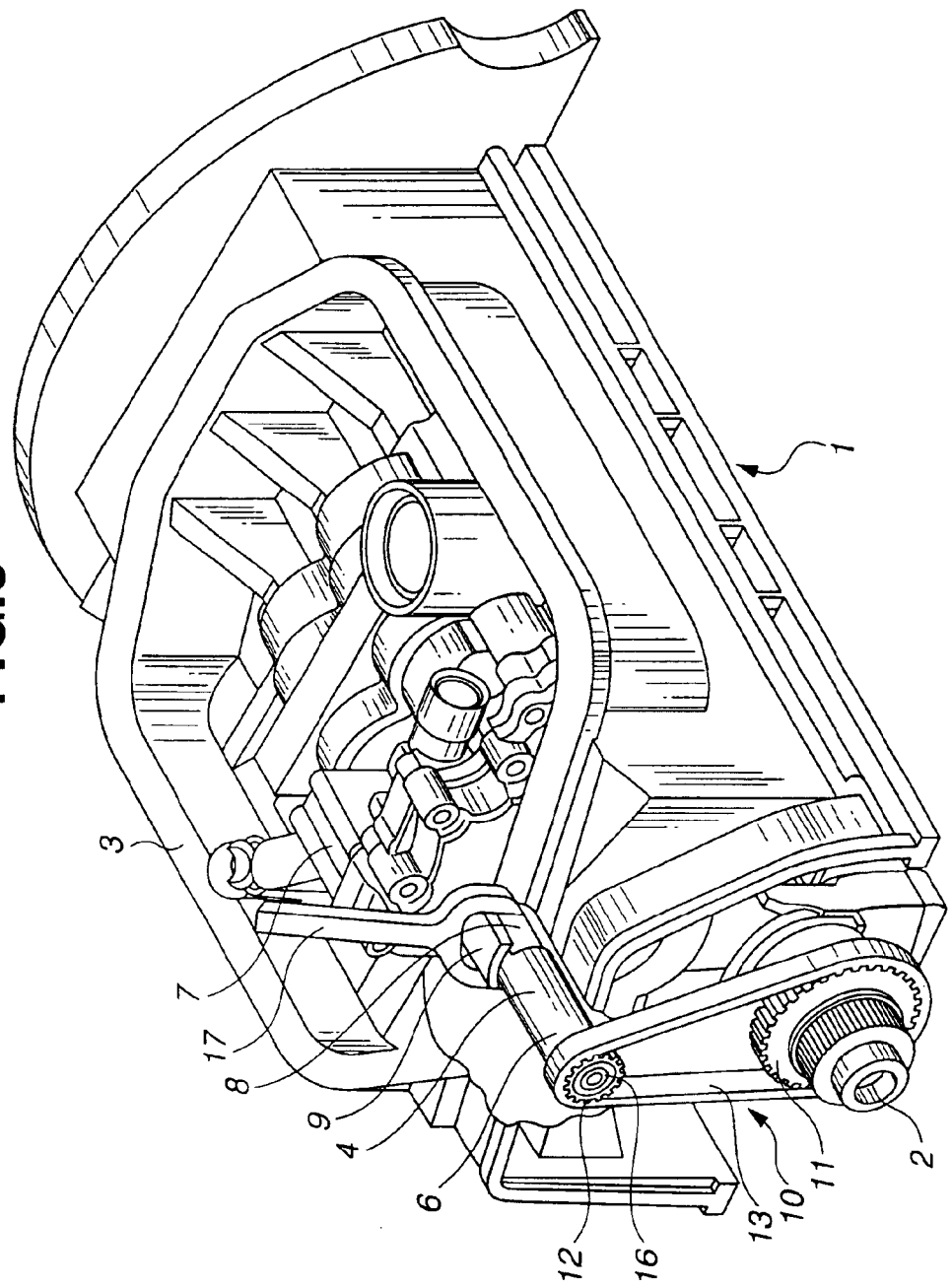
FIG. 3 is a perspective view of the internal combustion engine of FIG. 1 though the engine is shown in a state of being turned upside down.

The U-shaped jaw of tool 17 can fittingly grip flattened section 8 of drive side balancer shaft 4 and roof-like arcuated protrusion 9 only when flattened section 8 is in a correct rotational or phase position (i.e., when flat surfaces 18, 19 of flattened section 8 and opposite end surfaces 9a, 9b of roof-like arcuated protrusion 9 are nearly positioned on respective common vertical planes). Under the condition where the U-shaped jaw of tool 17 grips flattened section 8 and roof-like arcuate protrusion 9 for thereby preventing balancer shaft 4 from rotating, a power transmitting mechanism 10 including sprockets 11, 12 and chain 13 is installed on end portions of crankshaft 2 and balancer shaft 4. Further, in installation of power transmitting mechanism 10, an installation work is performed while holding engine block 1 in a state of its side to be attached to a cylinder block (not shown) being disposed on the lower side as shown in FIG. 3. This makes it possible to perform the installation work of power transmitting mechanism 10 without the necessity of holding tool 17 by hands after tool 17 is fitted on flattened section 8 and roof-like arcuated protrusion 9.

Driven side balancer shaft 5 is shorter than drive side balancer shaft 4 and drivingly connected at an end to oil pump 7 so as to drive the same. Oil pump 7 is supported by balancer housing 3. By this, the tooth striking sound produced by reverse gears respectively provided to balancer shafts 4, 5 can be suppressed by a damping effect (silencing effect) produced by oil pump 7. Further, driven side balancer shaft 5 is adapted to rotate at double the speed of crankshaft 2, so that oil pump 7 can discharge a sufficient amount of oil and therefore can be smaller in size.

To end portions of crankshaft 2 and drive side balancer shaft 4 (the left-hand end portions in FIG. 1) is installed power transmitting mechanism 10 by way of which balancer shaft 4 is driven by crankshaft 2.

Power transmitting mechanism 10 includes crank sprocket 11 adapted to be installed on crankshaft 2, balancer sprocket 12 adapted to be installed on drive side balancer shaft 4 and chain 13 wound around sprockets 11, 12.

Then, installation of power transmitting mechanism 10 on crankshaft 2 and drive side balancer shaft 4 will be described.

Firstly, flattened section 8 of drive side balancer shaft 4 and roof-like arcuated protrusion 9 of balancer housing 3 are gripped by the U-shaped jaw of tool 17 under the condition where flattened section 8 corresponds in the rotational phase to roof-like arcuate protrusion 9, thus preventing drive side balancer shaft 4 from rotating relative to balancer housing 3 and therefore engine block 1 (refer to FIGS. 3 to 5).

In this connection, the U-shaped jaw of tool 17 has a gripping width that is equal to or a little larger than the width of flattened section 8 of drive side balancer shaft 4 (i.e., the distance between flat surfaces 18, 19) and roof-like arcuate protrusion 9 of balancer housing 3 (i.e., the distance between end surfaces 9a, 9b). By this, by fitting the jaw of tool 17 on flattened section 8 and roof-like arcuate protrusion 9 under the condition where flattened section 8 and roof-like arcuate protrusion 9 correspond in phase to each other (i.e., flat surfaces 18, 19 of flattened section 8 are nearly coplanar with opposite end surfaces 9a, 9b of roof-like arcuate protrusion 9, respectively), drive side balancer shaft 4 can be located in a predetermined rotational or phase position (refer to FIG. 5).

Then, crank sprocket 11 and balancer sprocket 12 of power transmitting mechanism 10 are fixedly attached to crankshaft 2 and drive side balancer shaft 4, respectively. In this instance, balancer sprocket 12 is secured to drive side balancer shaft 4 by sprocket bolt 16.

In the meantime, if the phase of flattened section 8 of drive side balancer shaft 4 differs from a correct phase position by 180 degrees as shown in FIG. 6, tool 17 cannot be fitted on flattened section and roof-like protrusion 9.

As having been described above, since flattened section 8 and roof-like arcuate protrusion 9 are asymmetrical about the center axis of drive side balancer shaft 4, a correct rotational or phase position of flattened section 8 of drive side balancer shaft 4 can be one, thus making it possible to carry out installation of power transmitting mechanism 10 under a condition where drive side balancer shaft 4 is held at a predetermine rotational or phase position.

In the foregoing, it will be understood that according to the present invention, only one of a plurality of balancer shafts 4, 5 that is directly driven by power transmitting mechanism 10 is provided with end portion 6 protruding outward of balancer housing 3, which end portion 6 is partly cut to form flattened section 8 that constitutes a device for positioning balancer shaft 4 in a predetermined rotational or phase position. In installation of crank sprocket 11 and balancer sprocket 12 of power transmitting mechanism 10, flattened section 8 of drive side balancer shaft 4 can be gripped by tool 17 and thereby located in a predetermined phase position, thus making it possible to perform an installation work under a condition of balancer shaft 4 being prevented from rotation. Particularly, a work for securing balancer sprocket 12 to drive side balancer shaft 4 by means of sprocket bolt 16 can be done with ease.

It will be further understood that according to the present invention, balancer housing 3 has roof-like arcuate protrusion 9 that is opposed to flattened section 8 in the radial direction of balancer shaft 4 and that cooperates with flattened section 8 of balancer shaft 4 to constitute the device for positioning balancer shaft 4 in the predetermined rotational or phase position. In installation of power transmitting mechanism 10, roof-shaped arcuated protrusion 9 of balancer housing 3 is gripped by tool 17 together with flattened section 8 of balancer shaft 4, thus making it possible to perform an installation work with ease.

It will be further understood that according to the present invention, flattened section 8 is formed asymmetrical about the center axis of balancer shaft 4 or flattened section 8s is formed so as to have a center of gravity that is offset from the center of balancer shaft 4. Due to this, the phase position of drive side balancer shaft 4 relative to roof-shaped arcuate protrusion 9 can be only one (i.e., a correct phase position), thus enabling tool 17 to grip flattened section 8 only when drive side balancer shaft 4 is in a correct rotational or phase position. On the other hand, in case flattened section 8 of drive side balancer shaft 4 is in a reverse phase position, tool 17 cannot grip flattened section 8. Accordingly, rotating balancer shaft 4 into a predetermined rotational or phase position can be attained with ease and it becomes possible to prevent balancer shaft 4 from being installed at a phase position that is shifted from a correct phase position by 180 degrees.

It will be further understood that according to the present invention, flattened section 8 of balancer shaft 4 has flat surfaces 18, 19 and is shaped asymmetrical about the center axis of balancer shaft 4 so that one of flat surfaces 18, 19 that is positioned on the leading side with respect to clockwise rotation of balancer shaft 4 when observed in FIG. 5 is larger than flat surface 19 that is positioned on the trailing side. In installation of balancer sprocket 12 to drive side balancer shaft 4 by holding balancer shaft 4 stationarily in a predetermined position (i.e., correct phase position) by tool 17, larger flat surface 18 is urged against the corresponding surface of tool 17 when balancer sprocket 12 is screwed to the end portion of balancer shaft 4 with sprocket bolt 16 of right-hand thread, thus enabling balancer shaft 4 to have a sufficient strength.

It will be further understood that according to the present invention, flattened section 8 is asymmetrical about the center axis of balancer shaft 4 or so shaped as to have, when observed in cross section, a center of gravity or geometrical center that is offset in the direction to cooperate with eccentric weight portions 4a of balancer shaft 4 to perform a balancing action. Due to this, rotation of flattened section 8 can suppress a secondary vibration of the engine, thus enabling eccentric weight portion 4a to be smaller.

It will be further understood that according to the present invention, driven side balancer shaft 5 that is not directly driven by power transmitting mechanism 10 is drivingly connected to oil pump 7 to drive the same. Due to this, by the damping effect produced by oil pump 7, the tooth striking sound that is produced by meshing of the reverse gears of drive side and driven side balancer shafts 4, 5 due to backlash can be suppressed.

The entire contents of Japanese Patent Applications P2003-029738 (filed Feb. 6, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An internal combustion engine comprising:
    a balancer housing;
    a balancer shaft having an eccentric weight portion and disposed within the balancer housing so as to be parallel with and rotatable in timed relation with a crankshaft; and
    a power transmitting mechanism that transmits rotation of the crankshaft to the balancer shaft;
    wherein the balancer shaft has an end portion protruding outward of the balancer housing; and
    wherein the end portion of the balancer shaft is partially cut to have a flattened section that constitutes a device for positioning the balancer shaft in a predetermined rotational position.

2. An internal combustion engine according to claim 1, wherein the balancer housing has a roof-like arcuated protrusion that is opposed to the flattened section in the radial direction of the balancer shaft, the roof-like arcuated protrusion cooperating with the flattened section of the balancer shaft to constitute the device for positioning the balancer shaft in the predetermined rotational position.

3. An internal combustion engine according to claim 2, wherein the roof-like arcuated protrusion is asymmetrical about a center axis of the balancer shaft.

4. An internal combustion engine according to claim 1, wherein the flattened section is asymmetrical about a center axis of the balancer shaft.

5. An internal combustion engine according to claim 4, wherein the flattened section has a pair of parallel flat surfaces that are diametrically opposed to each other and unequally distant from the center axis of the balancer shaft.

6. An internal combustion engine according to claim 5, wherein one of the flat surfaces that is located on a leading side with respect to a direction in which the balancer shaft is urged to rotate upon installation of the power transmitting mechanism on the balancer shaft is larger than the other of the flat surfaces.

7. An internal combustion engine according to claim 6, wherein the power transmitting mechanism comprises a balancer sprocket that is screwed to an end portion of the balancer shaft with a bolt.

8. An internal combustion engine according to claim 6, wherein the roof-like arcuate protrusion has opposite end surfaces, the distance between which is substantially equal to that between the flat surfaces of the balancer shaft so that the opposite end surfaces of the roof-like arcuate protrusion are coplanar with the respective flat surfaces of the flattened section of the balancer shaft when the balancer shaft is in the predetermined rotational position.

9. An internal combustion engine according to claim 4, wherein the flattened section is shaped so as to have a center of gravity that is offset from the center axis of the balancer shaft in the direction to assist a balancing operation of the eccentric weight portion of the balancer shaft.

10. An internal combustion engine according to claim 1, further comprising a second balancer shaft that is disposed in parallel with the first-mentioned balancer shaft and indirectly driven by the power transmitting mechanism, the second balancer shaft being drivingly connected to an oil pump.

11. An internal combustion engine according to claim 1, wherein the power transmitting mechanism comprises a crank sprocket installed on an end portion of the crankshaft, a balancer sprocket installed on the balancer shaft and a chain wound around the crank sprocket and the balancer sprocket.

12. A method of assembling an internal combustion engine with a balancer shaft comprising:
    disposing within a balancer housing a balancer shaft having an eccentric weight portion so as to be parallel with and rotatable in timed relation with a crankshaft;
    providing the balancer shaft with an end portion protruding outward of the balancer housing;
    partly cutting the end portion of the balancer shaft to form a flattened section used for positioning of the balancer shaft;
    providing the balancer housing with a roof-like arcuated protrusion that is opposed to the flattened section in the radial direction of the balancer shaft; and fitting a U-shaped jaw of a tool on the flattened section and the roof-like arcuated protrusion and thereby positioning the balancer shaft in a predetermined rotational position.

13. A method according to claim 12, wherein the roof-like arcuated protrusion is asymmetrical about a center axis of the balancer shaft.

14. A method according to claim 12, wherein the flattened section is asymmetrical about a center axis of the balancer shaft.

15. A method according to claim 14, wherein the flattened section has a pair of parallel flat surfaces that are diametrically opposed to each other and unequally distant from the center axis of the balancer shaft.

16. A method according to claim 15, wherein one of the flat surfaces that is located on a leading side with respect to a direction in which the balancer shaft is urged to rotate upon installation of the power transmitting mechanism on the balancer shaft is larger than the other of the flat surfaces.

17. A method according to claim 16, wherein the power transmitting mechanism comprises a balancer sprocket that is screwed to an end portion of the balancer shaft with a bolt.

18. A method according to claim 16, wherein the roof-like arcuate protrusion has opposite end surfaces, the distance between which is substantially equal to that between the flat surfaces of the balancer shaft so that the opposite end surfaces of the roof-like arcuate protrusion are coplanar with the respective flat surfaces of the flattened section of the balancer shaft when the balancer shaft is in the predetermined rotational position.

* * * * *